(12) United States Patent
Innan et al.

(10) Patent No.: US 7,184,378 B2
(45) Date of Patent: Feb. 27, 2007

(54) STORAGE SYSTEM AND CONTROLLING METHOD THEREOF, AND DEVICE AND RECORDING MEDIUM IN STORAGE SYSTEM

(75) Inventors: Masataka Innan, Odawara (JP); Akinobu Shimada, Chigasaki (JP); Hideo Tabuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/828,881

(22) Filed: Apr. 20, 2004

(65) Prior Publication Data
US 2005/0160222 A1    Jul. 21, 2005

(30) Foreign Application Priority Data
Jan. 19, 2004   (JP) ............................. 2004-011105

(51) Int. Cl.
*G11B 5/09* (2006.01)
*G06F 12/00* (2006.01)

(52) U.S. Cl. .................... 369/47.23; 711/114; 711/202; 709/212; 710/22

(58) Field of Classification Search .................... None
See application file for complete search history.

(56) References Cited

U.S. PATENT DOCUMENTS

| | | |
|---|---|---|
| 3,771,137 A | 11/1973 | Barner et al. |
| 4,025,904 A | 5/1977 | Adney et al. |
| 4,710,868 A | 12/1987 | Cocke et al. |
| 5,155,845 A | 10/1992 | Beal et al. |
| 5,408,465 A | 4/1995 | Gusella et al. |
| 5,459,957 A | 10/1995 | Winer |
| 5,504,982 A | 4/1996 | Chai et al. |
| 5,548,712 A | 8/1996 | Larson et al. |
| 5,574,950 A | 11/1996 | Hathorn et al. |
| 5,680,590 A | 10/1997 | Beardsley et al. |

(Continued)

FOREIGN PATENT DOCUMENTS

EP      0848321 A      6/1998

(Continued)

OTHER PUBLICATIONS

"Celerra Data Migration Service (CDMS)," White Paper, EMC Corporation Hopkinton, MA (Jan. 2002).

(Continued)

*Primary Examiner*—Tan Dinh
(74) *Attorney, Agent, or Firm*—Townsend and Townsend and Crew LLP

(57) ABSTRACT

A first storage device control device stores, when a first data write/read request is received, correspondences between first logical units and second logical units referenced when determining whether or not storage regions identified by first logical units set in the request are storage regions of the first logical device control device or storage regions of a second storage device control device, the second storage device control device transmits all or some of identification information (logical unit information) of the second logical units to a management computer, the first storage device control device transmits all or some of the correspondences (mapping information) to the management computer, and the management computer references the received logical unit information and the mapping information to generate information representing whether or not the second logical units are corresponded to the first logical units.

12 Claims, 13 Drawing Sheets

U.S. PATENT DOCUMENTS

| | | | |
|---|---|---|---|
| 5,680,640 A | 10/1997 | Ofek et al. | |
| 5,758,118 A | 5/1998 | Choy et al. | |
| 5,809,285 A | 9/1998 | Hilland | |
| 5,835,954 A | 11/1998 | Duyanovich et al. | |
| 5,870,537 A | 2/1999 | Kern et al. | |
| 5,895,495 A | 4/1999 | Loechel et al. | |
| 5,917,723 A | 6/1999 | Binford | |
| 5,946,714 A * | 8/1999 | Miyauchi | 711/205 |
| 5,956,750 A | 9/1999 | Yamamoto et al. | |
| 5,978,890 A | 11/1999 | Ozawa et al. | |
| 6,012,123 A | 1/2000 | Pecone et al. | |
| 6,044,367 A | 3/2000 | Wolff | |
| 6,044,444 A | 3/2000 | Ofek | |
| 6,098,129 A | 8/2000 | Fukuzawa et al. | |
| 6,101,497 A | 8/2000 | Ofek | |
| 6,108,748 A | 8/2000 | Ofek et al. | |
| 6,173,374 B1 | 1/2001 | Heil et al. | |
| 6,195,730 B1 | 2/2001 | West | |
| 6,209,002 B1 | 3/2001 | Gagne et al. | |
| 6,219,753 B1 | 4/2001 | Richardson | |
| 6,230,239 B1 | 5/2001 | Sakaki et al. | |
| 6,240,486 B1 | 5/2001 | Ofek et al. | |
| 6,240,494 B1 | 5/2001 | Nagasawa et al. | |
| 6,247,099 B1 | 6/2001 | Skazinski et al. | |
| 6,247,103 B1 | 6/2001 | Kern et al. | |
| RE37,305 E | 7/2001 | Chang et al. | |
| 6,341,329 B1 | 1/2002 | LeCrone et al. | |
| 6,353,895 B1 | 3/2002 | Stephenson | |
| 6,356,977 B2 | 3/2002 | Ofek et al. | |
| 6,363,462 B1 | 3/2002 | Bergsten et al. | |
| 6,446,141 B1 | 9/2002 | Nolan et al. | |
| 6,446,175 B1 | 9/2002 | West et al. | |
| 6,453,354 B1 | 9/2002 | Jiang et al. | |
| 6,457,109 B1 | 9/2002 | Milillo et al. | |
| 6,457,139 B1 | 9/2002 | D'Errico et al. | |
| 6,480,934 B1 | 11/2002 | Hino et al. | |
| 6,484,173 B1 | 11/2002 | O'Hare et al. | |
| 6,490,659 B1 | 12/2002 | McKean et al. | |
| 6,523,096 B2 | 2/2003 | Sanada et al. | |
| 6,529,976 B1 | 3/2003 | Fukuzawa et al. | |
| 6,553,408 B1 | 4/2003 | Merrell et al. | |
| 6,560,673 B2 | 5/2003 | Elliott | |
| 6,587,935 B2 | 7/2003 | Ofek | |
| 6,598,134 B2 | 7/2003 | Ofek et al. | |
| 6,618,798 B1 | 9/2003 | Burton et al. | |
| 6,622,220 B2 | 9/2003 | Yoshida et al. | |
| 6,640,278 B1 | 10/2003 | Nolan et al. | |
| 6,640,291 B2 | 10/2003 | Fujibayashi et al. | |
| 6,647,387 B1 | 11/2003 | McKean et al. | |
| 6,647,414 B1 | 11/2003 | Yanai et al. | |
| 6,647,476 B2 | 11/2003 | Nagasawa et al. | |
| 6,654,830 B1 | 11/2003 | Taylor et al. | |
| 6,654,831 B1 | 11/2003 | Otterness et al. | |
| 6,675,258 B1 | 1/2004 | Bramhall et al. | |
| 6,675,268 B1 | 1/2004 | Binford et al. | |
| 6,681,303 B1 | 1/2004 | Watanabe et al. | |
| 6,681,339 B2 | 1/2004 | McKean et al. | |
| 6,684,310 B2 | 1/2004 | Anzai et al. | |
| 6,697,367 B1 | 2/2004 | Halstead et al. | |
| 6,708,232 B2 | 3/2004 | Obara | |
| 6,718,404 B2 | 4/2004 | Reuter et al. | |
| 6,745,281 B1 | 6/2004 | Saegusa | |
| 6,769,072 B1 * | 7/2004 | Kawamura et al. | 714/5 |
| 6,772,315 B1 | 8/2004 | Perego | |
| 6,799,255 B1 | 9/2004 | Blumenau et al. | |
| 6,816,948 B2 | 11/2004 | Kitamura et al. | |
| 6,826,778 B2 | 11/2004 | Bopardikar et al. | |
| 6,851,020 B2 | 2/2005 | Matsumoto et al. | |
| 6,857,057 B2 | 2/2005 | Nelson et al. | |
| 6,876,656 B2 | 4/2005 | Brewer et al. | |
| 6,883,064 B2 | 4/2005 | Yoshida et al. | |
| 6,922,761 B2 | 7/2005 | O'Connell et al. | |
| 6,973,549 B1 | 12/2005 | Testardi | |
| 6,976,103 B1 | 12/2005 | Watanabe et al. | |
| 2001/0050915 A1 | 12/2001 | O'Hare et al. | |
| 2001/0052018 A1 | 12/2001 | Yokokura | |
| 2001/0054133 A1 | 12/2001 | Murotani et al. | |
| 2002/0004857 A1 | 1/2002 | Arakawa et al. | |
| 2002/0004890 A1 | 1/2002 | Ofek et al. | |
| 2002/0019908 A1 | 2/2002 | Reuter et al. | |
| 2002/0019920 A1 | 2/2002 | Reuter et al. | |
| 2002/0019922 A1 | 2/2002 | Reuter et al. | |
| 2002/0019923 A1 | 2/2002 | Reuter et al. | |
| 2002/0026558 A1 | 2/2002 | Reuter et al. | |
| 2002/0029326 A1 | 3/2002 | Reuter et al. | |
| 2002/0065864 A1 | 5/2002 | Hartsell et al. | |
| 2002/0087544 A1 | 7/2002 | Selkirk et al. | |
| 2002/0087751 A1 | 7/2002 | Chong | |
| 2002/0103889 A1 | 8/2002 | Markson et al. | |
| 2002/0112113 A1 | 8/2002 | Karpoff et al. | |
| 2002/0124108 A1 | 9/2002 | Terrell et al. | |
| 2002/0133735 A1 | 9/2002 | McKean et al. | |
| 2002/0156887 A1 | 10/2002 | Hashimoto | |
| 2002/0156984 A1 | 10/2002 | Padovano | |
| 2002/0156987 A1 | 10/2002 | Gajjar et al. | |
| 2002/0178328 A1 | 11/2002 | Honda et al. | |
| 2002/0178335 A1 | 11/2002 | Seikirk et al. | |
| 2002/0188592 A1 | 12/2002 | Leonhardt et al. | |
| 2002/0194428 A1 | 12/2002 | Green | |
| 2002/0194523 A1 | 12/2002 | Ulrich et al. | |
| 2003/0037071 A1 | 2/2003 | Harris et al. | |
| 2003/0051109 A1 | 3/2003 | Cochran | |
| 2003/0056038 A1 | 3/2003 | Cochran | |
| 2003/0097607 A1 | 5/2003 | Bessire | |
| 2003/0101228 A1 | 5/2003 | Busser et al. | |
| 2003/0105931 A1 | 6/2003 | Weber et al. | |
| 2003/0115218 A1 | 6/2003 | Bobbitt et al. | |
| 2003/0115432 A1 | 6/2003 | Biessener et al. | |
| 2003/0126327 A1 | 7/2003 | Pesola et al. | |
| 2003/0145168 A1 | 7/2003 | LeCrone et al. | |
| 2003/0145169 A1 | 7/2003 | Nagasawa et al. | |
| 2003/0158999 A1 | 8/2003 | Hauck et al. | |
| 2003/0163553 A1 | 8/2003 | Kitamura et al. | |
| 2003/0167419 A1 | 9/2003 | Yanai et al. | |
| 2003/0182525 A1 | 9/2003 | O'Connell et al. | |
| 2003/0189936 A1 | 10/2003 | Terrell et al. | |
| 2003/0200387 A1 | 10/2003 | Urabe et al. | |
| 2003/0204597 A1 | 10/2003 | Arakawa et al. | |
| 2003/0204700 A1 | 10/2003 | Biessener et al. | |
| 2003/0212854 A1 | 11/2003 | Kitamura et al. | |
| 2003/0212860 A1 | 11/2003 | Jiang et al. | |
| 2003/0221077 A1 | 11/2003 | Ohno et al. | |
| 2003/0229645 A1 | 12/2003 | Mogi et al. | |
| 2003/0229764 A1 | 12/2003 | Ohno et al. | |
| 2004/0003022 A1 | 1/2004 | Garrison et al. | |
| 2004/0028043 A1 | 2/2004 | Maveli et al. | |
| 2004/0049553 A1 | 3/2004 | Iwamura et al. | |
| 2004/0054850 A1 | 3/2004 | Fisk | |
| 2004/0054866 A1 | 3/2004 | Blumenau et al. | |
| 2004/0064610 A1 | 4/2004 | Fukuzawa et al. | |
| 2004/0064641 A1 | 4/2004 | Kodama | |
| 2004/0068637 A1 | 4/2004 | Nelson et al. | |
| 2004/0073831 A1 | 4/2004 | Yanai et al. | |
| 2004/0098547 A1 | 5/2004 | Ofek et al. | |
| 2004/0103247 A1* | 5/2004 | Bita et al. | 711/114 |
| 2004/0103261 A1 | 5/2004 | Honda et al. | |
| 2004/0111485 A1 | 6/2004 | Mimatsu et al. | |
| 2004/0123180 A1 | 6/2004 | Soejima et al. | |
| 2004/0139237 A1 | 7/2004 | Rangan et al. | |
| 2004/0143832 A1 | 7/2004 | Yamamoto et al. | |
| 2004/0148443 A1 | 7/2004 | Achiwa et al. | |
| 2004/0158652 A1 | 8/2004 | Obara | |
| 2004/0158673 A1 | 8/2004 | Matsunami et al. | |
| 2004/0172510 A1 | 9/2004 | Nagashima et al. | |

| | | | |
|---|---|---|---|
| 2004/0230980 A1 | 11/2004 | Koyama et al. | |
| 2004/0260875 A1 | 12/2004 | Murotani et al. | |
| 2004/0260966 A1 | 12/2004 | Kalya et al. | |
| 2004/0267838 A1 | 12/2004 | Curran et al. | |
| 2005/0010734 A1 | 1/2005 | Soejima et al. | |
| 2005/0010743 A1 | 1/2005 | Tremblay et al. | |
| 2005/0033878 A1 | 2/2005 | Pangal et al. | |
| 2005/0050288 A1* | 3/2005 | Takahashi et al. | 711/162 |
| 2005/0055501 A1 | 3/2005 | Guha et al. | |
| 2005/0081009 A1 | 4/2005 | Williams et al. | |
| 2005/0138184 A1 | 6/2005 | Amir et al. | |
| 2006/0190550 A1* | 8/2006 | Innan et al. | 709/212 |

FOREIGN PATENT DOCUMENTS

| | | |
|---|---|---|
| JP | 09-288547 A | 11/1997 |
| JP | 10-283272 A | 10/1998 |
| JP | 11-065980 A | 3/1999 |
| JP | 2000-293317 A | 10/2000 |
| JP | 2001-067187 A | 3/2001 |
| JP | 2001-249853 A | 9/2001 |
| JP | 2001-331355 A | 11/2001 |
| JP | 2002-007304 | 1/2002 |
| JP | 2002-091706 | 3/2002 |
| JP | 2002-157091 A | 5/2002 |
| JP | 2002-230246 A | 8/2002 |
| WO | WO03/023640 A2 | 3/2003 |

OTHER PUBLICATIONS

"Data Migration Solution Transferring Data Between Storage Systems over Fibre-channel or SCSI Connections," SANRAD Application Note: APP-033-03, SANRAD Inc. San Mateo, CA (2003).

"Migrating Individual Servers to an iSCSI SAN," SANRAD Application Note:APP-004-0 1, SANRAD Inc. San Mateo, CA (2003).

"Network Attached Storage in the Data Protection Environment," Sony Electronics Inc. (Feb. 2002).

Anderson et al. "Hippodrome: Running Circles Around Storage Administration," Proceedings of the 1st USENIX Conference on File and Storage Technologies (Jan. 2002).

Meggyesi "Fibre Channel Overview," High Speed Interconnect project European Laboratory of Particle Physics (CERN) web page http://hsi.web.cern.ch (Aug. 1994).

Sarkar et al. "Internet Protocol storage area networks," IBM Systems Journal 42:218-231 (2003).

Sicola "SCSI-3 Fault Tolerant Controller Configurations Utilizing SCC & New Event Codes," T10 Committee of the International Committee on Information Technology Standards (INCITS), X3T10 95 (Oct. 1995).

* cited by examiner

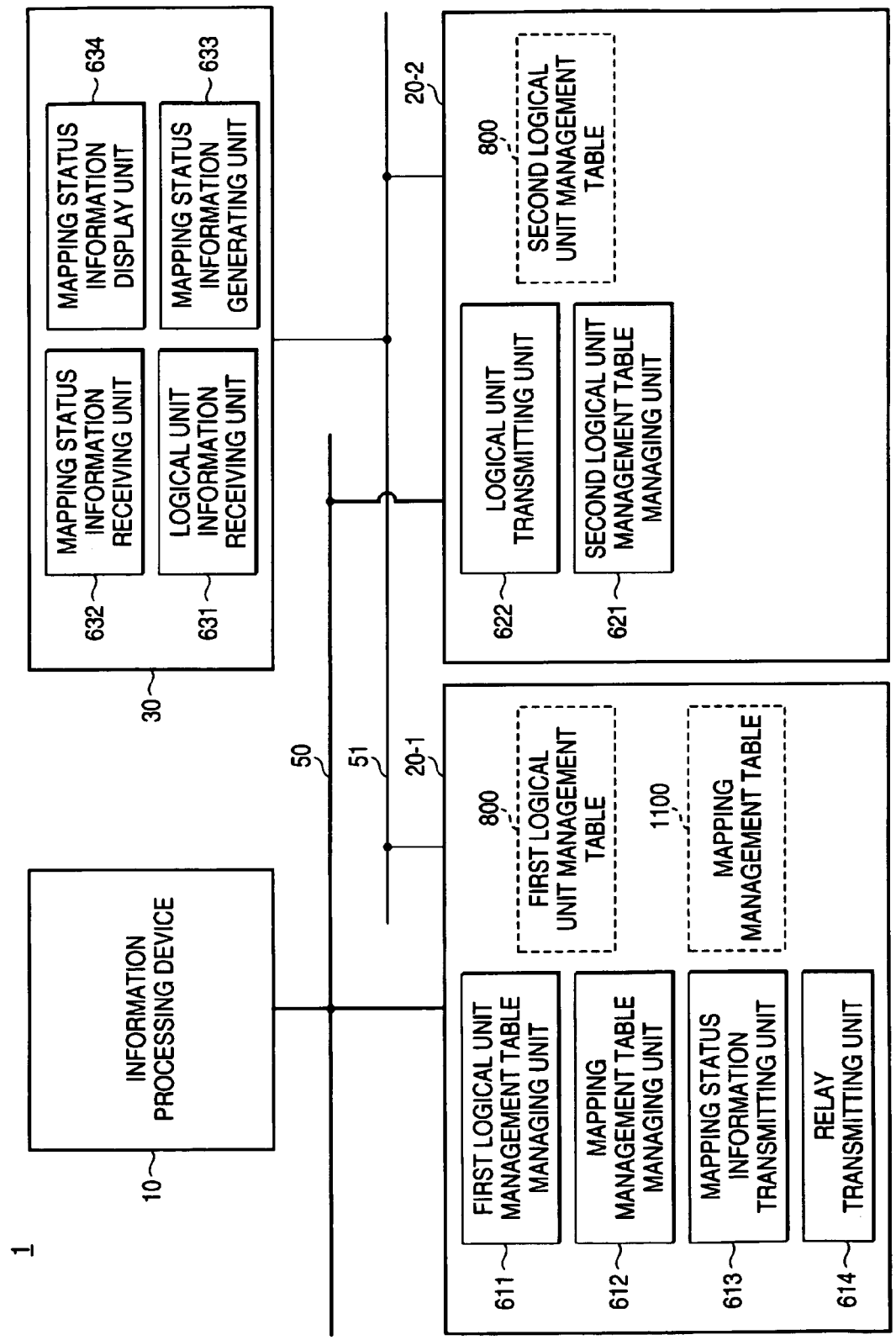

| COMMUNICATIONS PORT (WWNc) 811 | LUN 812 | LOGICAL DEVICE NUMBER 813 | STORAGE CAPACITY (GB) 814 |
|---|---|---|---|
| ⋮ | ⋮ | ⋮ | ⋮ |
| 00:00:00:60:01:00:50 | 0 | 1001 | 80 |
| | | 1002 | 80 |
| | | 1003 | 80 |
| | | 1004 | 80 |
| | | 1005 | 80 |
| | 1 | 1006 | 120 |
| | | 1007 | 120 |
| 00:00:00:60:01:00:51 | 0 | 1010 | 40 |
| | | 1011 | 40 |
| | | 1012 | 40 |
| | | 1013 | 40 |
| | | 1014 | 40 |
| ⋮ | ⋮ | ⋮ | ⋮ |

FIG. 11

| COMMUNICATIONS PORT (WWNc) | FIRST LUN | SECOND LUN | |
|---|---|---|---|
| ⋮ | ⋮ | ⋮ | |
| 00:00:00:60:01:00:50 | 0 | | ← 1121 |
| | 1 | | ← 1122 |
| 00:00:00:60:01:00:51 | 0 | | ← 1123 |
| 00:00:00:60:01:00:52 | 0 | 0 | ← 1124 |
| 00:00:00:60:01:00:53 | 1 | 1 | ← 1125 |
| ⋮ | ⋮ | ⋮ | |

FIG. 15

| COMMUNICATIONS PORT (WWNc) | LUN | LOGICAL DEVICE NUMBER | STORAGE CAPACITY (GB) | PRESENCE OF MAPPING |
|---|---|---|---|---|
| ........ | ........ | ........ | ........ | ........ |
| 00:00:00:60:01:00:71 | 0 | 1001 | 80 | YES |
| | | 1002 | 80 | |
| | | 1003 | 80 | |
| | | 1004 | 80 | |
| | | 1005 | 80 | |
| | 1 | 1006 | 120 | YES |
| | | 1007 | 120 | |
| 00:00:00:60:01:00:72 | 0 | 1010 | 40 | NO |
| | | 1011 | 40 | |
| | | 1012 | 40 | |
| | | 1013 | 40 | |
| | | 1014 | 40 | |
| ........ | ........ | ........ | ........ | ........ |

1500, 1511, 1512, 1513, 1514, 1515

STORAGE SYSTEM AND CONTROLLING METHOD THEREOF, AND DEVICE AND RECORDING MEDIUM IN STORAGE SYSTEM

CROSS-REFERENCE TO RELATED APPLICATION

This application relates to and claims priority from Japanese Patent Application No. 2004-011105, filed on Jan. 19, 2004, the entire disclosure of which is incorporated herein by reference.

BACKGROUND OF THE INVENTION

1. Field of the Invention

The present invention relates to a storage device control device, a storage system, a recording medium in which a program is stored, an information processing device and a storage system control method.

2. Description of the Related Art

The demand for disk control devices (disk array devices) has risen in accompaniment with the development of IT-related industries. Disk control devices are used as the major foundation for realizing various information services, such as data management services and Web services, provided in information service centers and data centers and the like.

In the past several years, the amount of data that disk control devices handle has been rapidly increasing. For this reason, the management burden and the management costs of disk control devices are rapidly increasing in data centers. Also, the disk control devices that are being introduced are a mixture of good and bad, and in order to raise the performance of disk control devices, homogenize functions and smoothly replace old disk control devices with new disk control devices, so-called storage system virtualization, which integrally handles the storage resources that disk control devices handle, is being accelerated. Above are described in JP-A-2002-7304 and JP-A-2002-91706, for example.

In such virtualization, technology that appropriately manages the storage resources of disk control devices becomes important. Namely, in order to prevent erroneous setting where a resource already allocated for one purpose ends up being allocated for another purpose, a mechanism that can reliably grasp the information relating to the storage resources managed by the disk control devices and which can appropriately allocate storage resources becomes necessary.

SUMMARY OF THE INVENTION

The present invention was made in light of this background, and it is an object thereof to provide a storage device control device, a storage system, a recording medium in which a program is stored, an information processing device and a storage system control method that can reliably manage the storage resources of disk control devices.

A main invention of the present invention that achieves this object is a storage device control device where, in a storage system including a first storage device control device that is communicably connected to a first information processing device, receives a first data write/read request transmitted from the first information processing device and conducts data writing/reading with respect to first storage devices in response to the request, a second storage device control device that is communicably connected to the first storage device control device, receives a second data write/read request transmitted from the first disk control device and conducts data writing/reading with respect to second storage devices in response to the request, and a second information processing device communicably connected to the first and second storage device control devices, wherein the first storage device control device includes a first logical unit management table managing unit that stores a first logical unit management table in which is registered identification information of first logical units that are units identifying storage regions of the first storage devices, the second storage device control device includes a second logical unit management table managing unit that stores a second logical unit management table in which is registered identification information of second logical units that are units identifying storage regions of the second storage devices, the first storage device control device includes a mapping management table managing unit that stores a mapping management table in which is registered correspondences between the first logical units and the second logical units and which the first storage device control device references when the first storage device control device receives the first data write/read request and determines whether the storage regions identified by the first logical units set in the request are the storage regions of the first storage devices or the storage regions of the second storage devices, the second storage device control device includes a logical unit information transmitting unit that transmits, to the second information processing device, logical unit information including all or some of the identification information of the second logical units registered in the second logical unit management table, the first storage device control device includes a mapping information transmitting unit that transmits, to the second information processing device, mapping information that is all or some of the mapping management table, the second information processing device includes a logical unit information receiving unit that receives the logical unit information, the second information processing device includes a mapping information receiving unit that receives the mapping information, and the second information processing device includes a mapping status information generating unit that references the received logical unit information and the mapping information to generate mapping status information that is information representing whether the second logical units are corresponded to the first logical units, the storage device control device includes the functions of the first storage device control device.

According to the invention, the storage resources of a disk control device can be reliably managed.

BRIEF DESCRIPTION OF THE DRAWINGS

FIG. 6 is a diagram showing main functions realized in the first and second disk array devices 20-1 and 20-2 and the management computer 30 configuring the storage system 1 described as an embodiment of the invention;

FIG. 8 is a diagram showing an example of a logical unit management table 800 described as an embodiment of the invention;

FIG. 11 is a diagram showing an example of a mapping management table 1100 described as an embodiment of the invention;

FIG. 15 is a diagram showing a logical unit status display screen 1500 described as an embodiment of the invention.

DESCRIPTION OF THE EMBODIMENTS

An embodiment of the invention will be described below with reference to the drawings.

Configuration of Storage System

Figure 1:
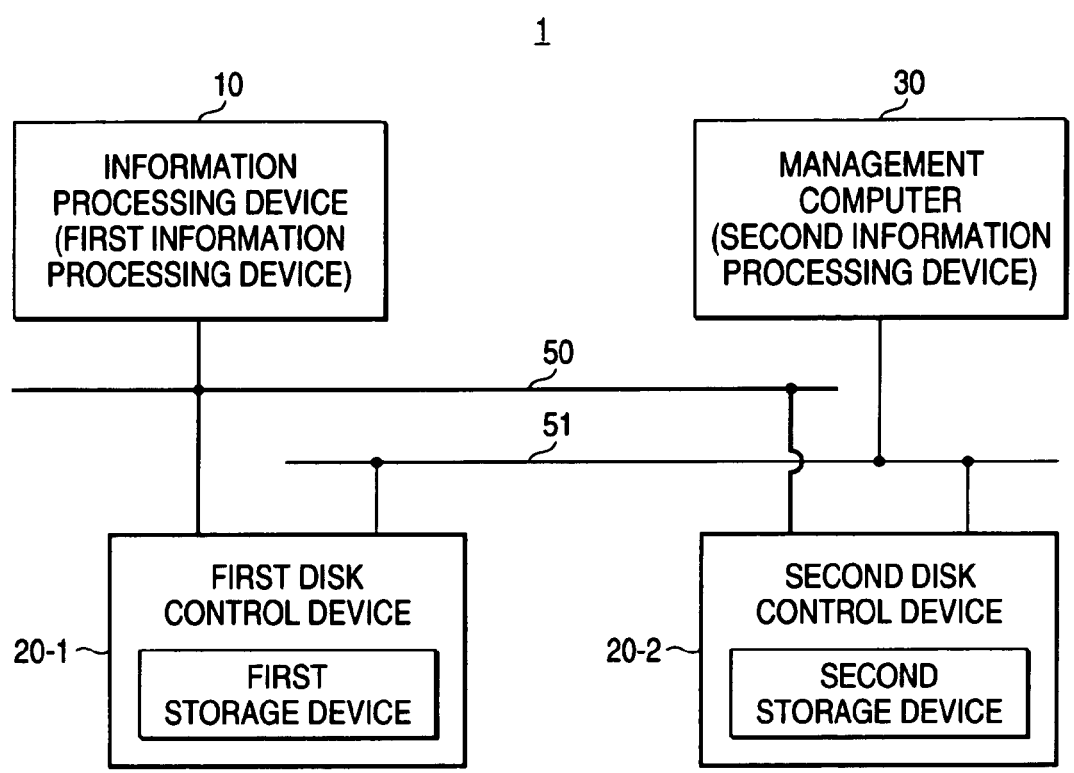
FIG. 1 is a diagram showing the schematic configuration of a storage system 1 described as an embodiment of the invention.

FIG. 1 shows the configuration of a storage system 1 described as an embodiment of the invention. The storage system 1 is configured to include an information processing device (first information processing device) 10, a first disk control device (first storage device control device) 20-1, a second disk control device (second storage device control device) 20-2 and a management computer (second information processing device) 30. The storage system 1 is operated in, for example, data centers and system centers in industries.

The information processing device 10 and the first and second disk control devices 20-1 and 20-2 are communicably connected via a first communications network 50. The first communications network 50 is, for example, a LAN (Local Area Network), a SAN (Storage Area Network), an iSCS (Internet Small Computer System Interface), ESCON (Enterprise Systems Connection) (registered trademark), FICON (Fibre Connection) (registered trademark), ACONA (Advanced Connection Architecture) (registered trademark) or FIBARC (Fibre Connection Architecture)(registered trademark). In the present embodiment, the first communications network 50 will be a SAN. Also, in the embodiment described below, the information processing device 10 and the second disk control device 20-2 are also communicably connected via the first communications network 50, but this connection configuration is not essential. The invention can be implemented as long as the second disk control device 20-2 is communicably connected to at least the first disk control device 20-1.

The management computer 30 is communicably connected to the first and second disk control devices 20-1 and 20-2 via a second communications network 51. The second communications network 51 is, for example, a LAN (Local Area Network). The management computer 30 and the first and second disk control devices 20-1 and 20-2 can also be communicably connected by a pair-to-pair connection mode using a communication line of a specification such as RS-232C or SCSI.

Figure 2:
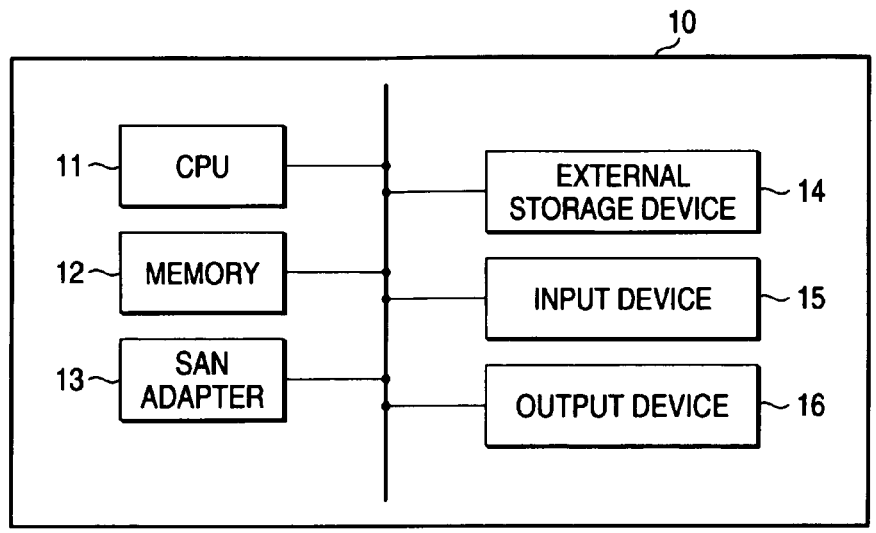
FIG. 2 is a diagram showing the hardware configuration of an information processing device 10 described as an embodiment of the invention.

The information processing device 10 is a computer such as, for example, a personal computer, a workstation or a mainframe. FIG. 2 shows the hardware configuration of the information processing device 10. The information processing device 10 is configured to include a CPU (Central Processing Unit) 11, a memory (ROM, RAM) 12, a SAN adapter 13, an external storage device 14 such as a hard disk drive, an input device 15 such as a mouse or a keyboard and a display device 16 such as a display. Of these, the SAN adapter 13 is a communications interface that connects the information processing device 10 to the SAN (first communications network 50). For example, an HBA (Host Bus Adapter) is used as the SAN adapter 13. There are also cases where the information processing device 10 is configured by plural integrated computers.

An operating system operates in the information processing device 10. Application software operates on the operating system. The application software provides, for example, the functions of an automated bank deposit and payment system and an airplane seat reservation system. The information processing device 10 transmits, to the first disk control device 20-1, data read/write requests (first data write/read request) (first data input/output request) in block units in accordance with the Fibre Channel Protocol. When the first disk control device 20-1 receives the data input/output request transmitted from the information processing device 10, the first disk control device 20-1 conducts, in response thereto, processing relating to the writing/reading of data (also referred to as data input/output below) with respect to later-described hard disk drives 28 that manage data input/output processing.

The first or second disk control device 20-1 or 20-2 can also be configured to function as an NAS (Network Attached Storage) configured to receive data input/output requests by file name designation from the information storage device 10 according to a protocol such as NFS (Network File System). In a case where the first communications network 50 is a LAN (Local Area Network) and the first disk control device 20-1 functions as an NAS (Network Attached Storage), file names are incidental to the aforementioned first data input/output requests or the second data input/output requests. Also, the disk control devices 20 may be devices that conduct data writing/reading with respect to a recording medium other than a hard disk drive, such as a solid state disk.

The management computer 30 is a computer such as a personal computer. An operating system operates in the management computer 30. Application software for managing, variously setting and monitoring the status of resources relating to the first and second disk control devices 20-1 and 20-2 operates on the operating system.

Figure 3:
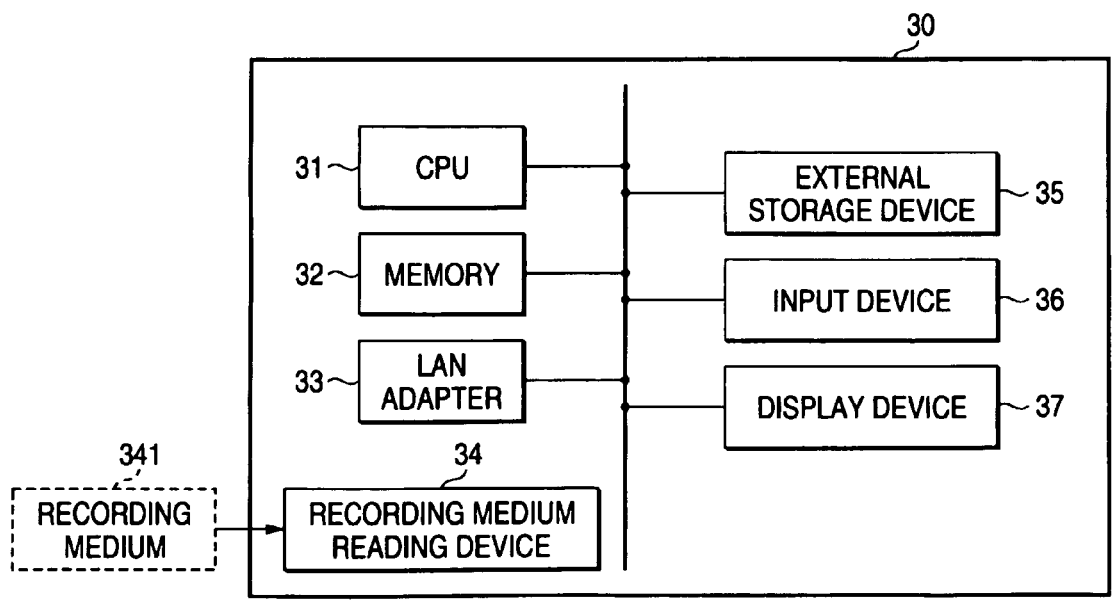
FIG. 3 is a diagram showing the hardware configuration of a management computer 30 described as an embodiment of the invention.

FIG. 3 shows the hardware configuration of the management computer 30. The management computer 30 includes a CPU (Central Processing Unit) 31, a memory (ROM, RAM) 32, a LAN adapter 33, a recording medium reading device 34 such as a CD-ROM device or a DVD-ROM device, an external storage device 35 such as a hard disk drive, an input device 36 such as a mouse or a keyboard and a display device 37 such as a display. The CPU 31 governs the entire control of the management computer 30. Various functions of the management computer 30 are realized by the CPU 31 executing programs stored in the memory 32. The recording medium reading device 34 is a device for reading programs and data recorded in a recording medium 341. The recording medium reading device 34 can be configured to read the data and programs recorded in the recording medium 341 and store the data and programs in the memory 32 and the external storage device 35. The recording medium 341, in which are recorded programs for realizing the various functions of the management computer 30, is set in the recording medium reading device 34, so that the programs can be installed in the management computer 30. A flexible disk, a CD-ROM, a DVD-ROM, a DVD-RAM or a solid state memory can be used as the recording medium 341.

The management computer 30 is communicably connected to the first and second disk control devices 20-1 and 20-2 via the LAN adapter 33. The management computer 30 can conduct data communication with the information processing device 10 and service processors (SVP) of the first and second disk control devices 20-1 and 20-2. The LAN adapter 33 is an interface for connecting the management computer 30 to the second communications network 51. An NIC (Network Interface Card), for example, is used as the LAN adapter 33.

Figure 4:
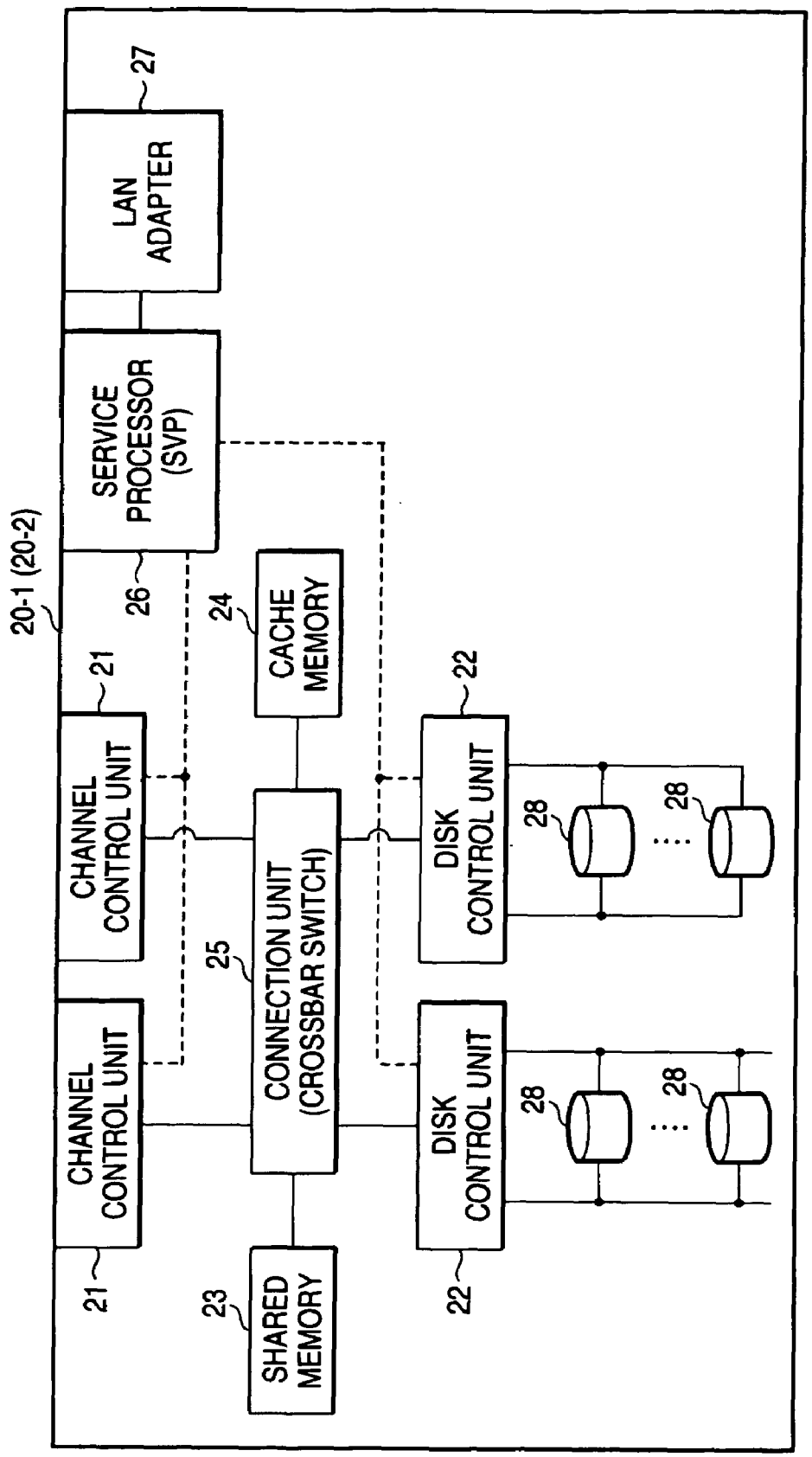
FIG. 4 is a diagram showing the hardware configuration describing the basic sections of first and second disk control devices 20-1 and 20-2 described as an embodiment of the invention.

In the present embodiment, it is supposed that the first disk control device 20-1 is functionally more high-performance than the second disk control device 20-2. It should be noted that the basic configurations of the first and second disk control devices 20-1 and 20-2 are the same. FIG. 4 shows an example of the hardware configuration of the first and second disk devices 20-1 and 20-2. The first and second disk control devices 20-1 and 20-2 are configured to include at least one channel unit 21, at least one disk control unit 22, a shared memory 23, a cache memory 24, a connection unit (crossbar switch) 25, a service processor (SVP) 26, a LAN adapter 27 and hard disk drives 28 serving as storage devices. As shown in FIG. 1, the hard disk drives 28 can be internally disposed in the respective casings of the first and second disk control devices 20-1 and 20-2 or be accommodated in a separate casing.

Figure 5A:
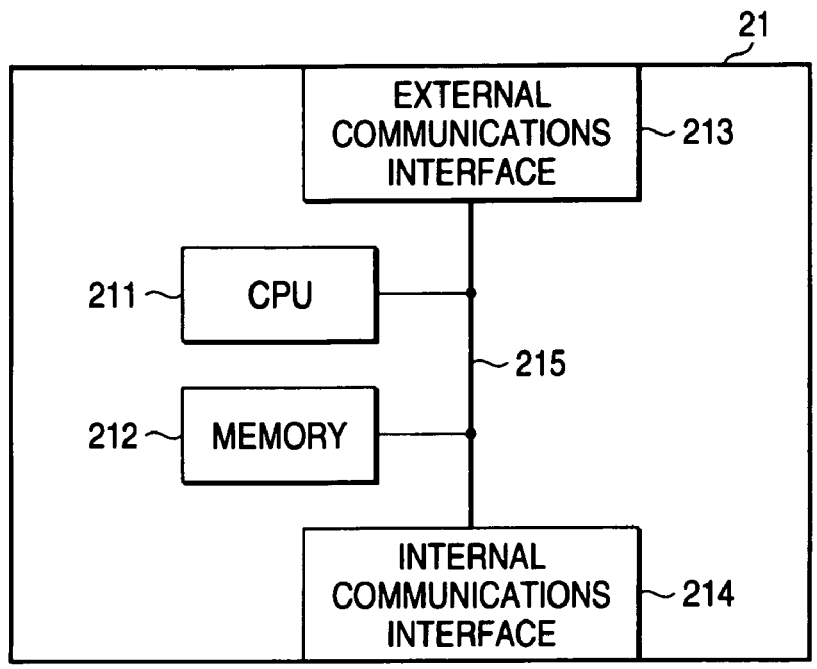
FIG. 5A is a diagram showing the hardware configuration of a channel control unit 21 described as an embodiment of the invention.

FIG. 5A shows the hardware configuration of the channel control unit 21. The channel control unit 21 includes a CPU 211, a memory (ROM, RAM) 212, an external communications interface 213 and an internal communications interface 214. These are connected by an internal bus 215 such as a PCI (Peripheral Component Interconnect Bus) bus and are integrally formed on, for example, a circuit board. The CPU 211 governs the entire control of the channel control unit 21. The CPU 211 realizes the various functions of the channel control unit 21 by executing programs stored in the memory 212. The external communications interface 213 is an interface for communicating with the information processing device 10 via the SAN (first communications network 50). The external communications interface 213 includes a communications port for connecting to the SAN (first communications network 50). The internal communications interface 214 transmits and receives data and commands via the connection unit 25 with the disk control unit 22, the shared memory 23 and the cache memory 24. The internal communications interface 214 conducts communication with the service processor 26. When the channel control unit 21 receives the first data input/output request (in the case of the first disk control device 20-1) or the second input/output request (in the case of the second control device 20-2) transmitted from the information processing device 10 (in the case of the first disk control device 20-1) or the first disk control device 20-1 (in the case of the second disk control device 20-2), the channel control unit 21 writes, to the shared memory 23, a command relating to data input/output with respect thereto.

Figure 5B:
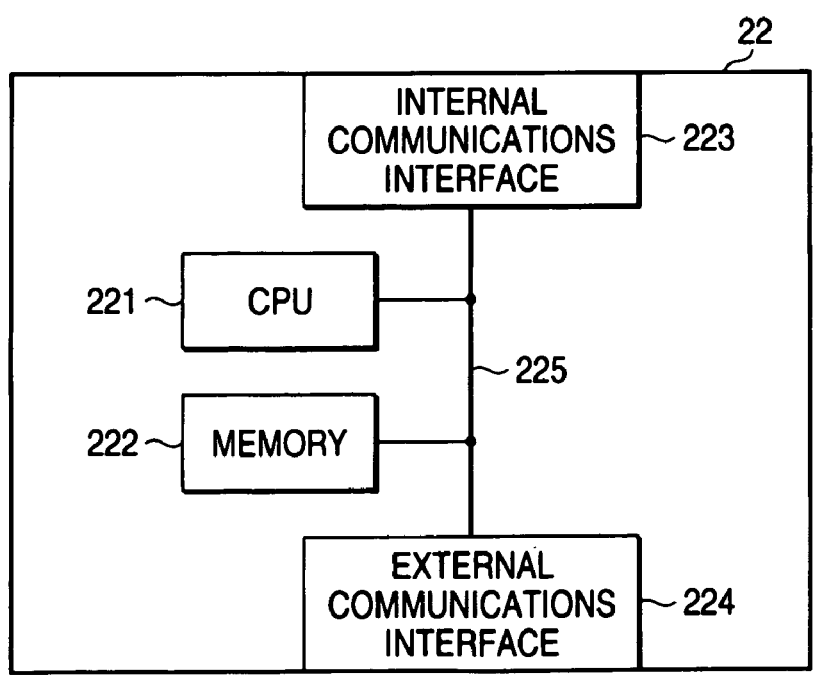
FIG. 5B is a diagram showing the hardware configuration of a disk control unit 22 described as an embodiment of the invention.

FIG. 5B shows the hardware configuration of the disk control unit 22. The disk control unit 22 conducts data reading/writing with respect to the hard disk drives 28 in accordance with a data write request that the channel control unit 21 has received from the information processing device 10. The disk control unit 22 includes a CPU 221, a memory 222, an internal communications interface 223 and a disk interface 224. These are connected by an internal bus 225 such as a PCI bus and are integrally formed on, for example, a circuit board. The CPU 221 governs the control of the entire disk control unit 22. The CPU 221 realizes the various functions of the disk control unit 22 by executing programs stored in the memory 222. The internal communications interface 223 transmits and receives data and commands via the connection unit 25 with the channel control unit 21, the shared memory 23 and the cache memory 24. The disk interface 224 conducts data reading/writing with respect to the hard disk drives 28. The disk interface 224 conducts data transmission and reception with the hard disk drives 28. The disk control unit 22 includes the function (RAID control unit) of controlling the hard disk drives 28 with a RAID level (e.g., 0, 1, 5) specified in the so-called RAID (Redundant Array of Inexpensive Disks) format.

The disk control unit 22 reads, from the shared memory 23, commands relating to the reading/writing (data input/output) of data written in the shared memory 23 by the channel control unit 21, and conducts data reading/writing processing (data input/output processing) with respect to the hard disk drives 28 in accordance with the commands. The disk control unit 22 writes, to the cache memory 24, data read from the hard disk drives 28. The disk control unit 22 appropriately transmits, to the channel control unit 21, notification of the completion of data writing and notification of the completion of data reading. When the channel control unit 21 receives the completion notification, the channel control unit 21 transmits to the information processing device 10 a response with respect to the data input/output request.

The shared memory 23 and the cache memory 24 are configured using a rewritable memory such as a RAM. Of these, the shared memory 23 stores mainly commands and data transmitted and received between the channel control unit 21 and the disk control unit 22. The cache memory 23 stores data serving as the target of data writing/reading conducted with respect to the hard disk drives 28, shortens the time (access time) it takes for the writing/reading of data conducted with respect to the hard disk drives 28, and improves the response performance with respect to the information processing device 10.

The connection unit (crossbar switch) 25 communicably interconnects the channel control unit 21, the disk control unit 22, the shared memory 23 and the cache memory 24.

The connection unit 25 is configured using, for example, a high-speed bus such as an ultrahigh-speed crossbar switch that conducts data transfer by high-speed switching.

The service processor (SVP) 26 is configured to include a CPU and a memory. The service processor 26 can itself be made to function as an independent computer. The service processor 26 receives operational input from an operator and monitors the operating status and conducts setting of the first and second disk control devices 20-1 and 20-2. The service processor 26 conducts communication with the channel control unit 21. The service processor 26 communicates with the management computer 30 via the LAN adapter 27 shown in FIG. 1. The service processor (SVP) 26 can also be disposed with a function as a Web server conducting communication in accordance with the HTTP (Hypertext Transfer Protocol) with an access request from an external device made via the second communications network 51. Here, all or some of the functions of the management computer 30 described in the present embodiment can be realized by the service processor (SVP) 26 of the first disk control device 20-1. In this case, all or some of the functions of the management computer 30 can be realized by the aforementioned Web server function.

The first and second disk control devices 20-1 and 20-2 in the present embodiment described above have a configuration that includes the channel control unit 21 and the disk control unit 22, but the invention can also be implemented using a disk control device of the type that collectively conducts communication with the information processing device 10 and data input/output processing with respect to the hard disk drives 28 with one CPU.

The functions realized in the first and second disk control devices 20-1 and 20-2 described in the present embodiment are realized by the hardware of the first and second disk control devices 20-1 and 20-2 or the CPU 211 of the channel control unit 21, the CPU 222 of the disk control unit 22 or the CPU configuring the service processor (SVP) 26 disposed in the first and second disk control devices 20-1 and 20-2 executing the programs stored in the memories 212 and 222 or the memory of the service processor (SVP) 26 or the shared memory 23.

FIG. 6 shows the main functions realized in the first and second disk array devices 20-1 and 20-2 and the management computer 30 configuring the storage system 1 of the present embodiment. In the first disk array device 20-1, a first logical unit management table managing unit 611, a mapping management table managing unit 612, a mapping information transmitting unit 613 and a relay transmitting unit 614 function. In the second disk array device 20-2, a second logical unit management table managing unit 621 and a logical unit information transmitting unit 622 function. In the management computer 30, a logical unit information receiving unit 631, a mapping information receiving unit 632, a mapping status information generating unit 633 and a mapping status information display unit 634 function.

Logical Connection Relation

Figure 7:
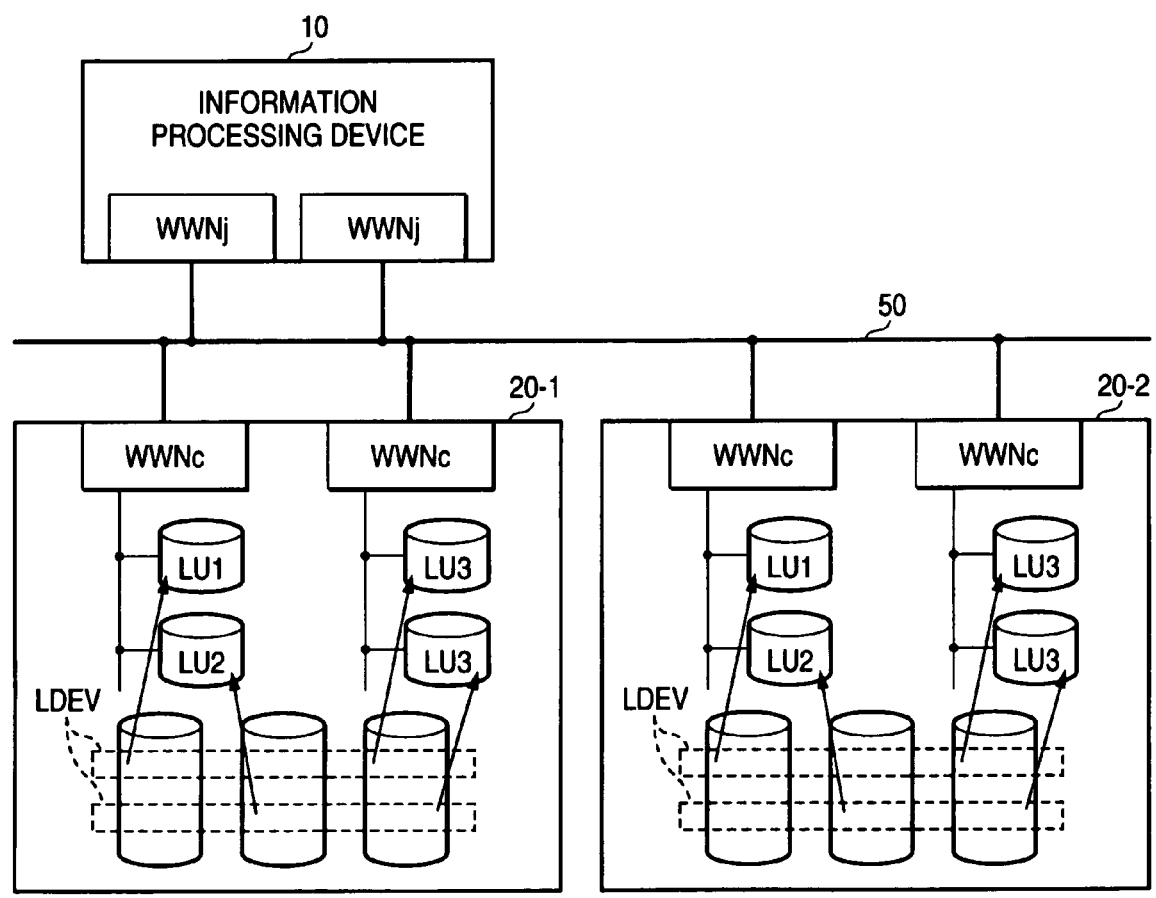
FIG. 7 is a diagram describing the logical connection relation in the storage system 1 described as an embodiment of the invention.

Next, the logical connection relation of the information processing device 10 and the first and second disk control devices 20-1 and 20-2 configuring the storage system 1 described in the present embodiment will be described. FIG. 7 is a diagram describing the logical connection relation. A WWN (World Wide Name), which is identification information for identifying the devices connected to the SAN (first communications network 50), is given to the SAN adapter 13 of the information processing device 10 (the WWN given to the information processing device 10 will be called WWNj below). The WWNj is given to each communications port of the SAN adapter 13 of the information processing device 10. For example, two WWNj are given to a SAN adapter 13 having two communications ports. A WWN is also given to each communication port to the SAN (first communications network 50) of the channel control unit 21 providing the communications function via the SAN (first communications network 50) in the disk control devices 20-1 and 20-2 (the WWN given to the first and second disk control devices 20-1 and 20-2 will be called WWNc below).

The information processing device 10 recognizes the storage regions provided by the first and second disk control devices 20 using, as units, logical units (also called LU below) that are logical storage regions. For example, in a case where the operating system installed in the information processing device 10 is a UNIX (registered trademark) operating system, the logical units (LU) are corresponded to device files. In a case where the operating system installed in the information processing device 10 is a Windows (registered trademark) operating system, the logical units (LU) are corresponded to drive letters (drive names). Identifiers for identifying the logical units (LU) are logical unit numbers (also called LUN below) uniquely given to each logical unit. The information processing device 10 identifies the logical units (LU) by designating the logical unit numbers (LUN). The LUN are set in data input/output requests transmitted from the information processing device 10 to the disk control devices 20. The disk control devices 20-1 and 20-2 receive the logical unit numbers (LUN) transmitted from the information processing device 10 to thereby identify storage positions on the hard disk drives 28 for data designated by the information processing device 10.

The first and second disk control devices 20-1 and 20-2 identify physical storage regions of the hard disk drives 28 using, as units, logical devices (LDEV) that are storage regions logically set using the storage regions. A logical device number that is unique to each logical device is given as an identifier to each logical device (LDEV). The disk control devices 20 of the present embodiment manage, as one logical device (LDEV), a parity group in the RAID 5 format.

The first and second disk control devices 20-1 and 20-2 manage the correspondences between the logical devices (LDEV) and the logical units that are management units of the storage regions in the information processing device 10. In order to manage these, the disk control devices 20-1 and 20-2 store a logical table management table 800 shown in FIG. 8 where the correspondences between the logical units (LU) and the logical devices (LDEV) are registered (functions of the first logical unit management table managing unit 611 and the second logical unit management table managing unit 621). The logical unit management table 800 is stored in, for example, the channel control unit 21, the disk control unit 22 and the service processor (SVP) 26. The logical units are corresponded to the communications ports of the channel disk control units 21 in the disk control devices 20-1 and 20-2. For this reason, the correspondences between the logical units (LU) and the communications ports are registered in the logical unit management table 800. In the logical unit management table 800 of FIG. 8, the WWNc (communications port ID) given to the communications ports of the channel control units 21 are set in a communications port ID column 811. The logical unit numbers (LUN) are set in a LUN column 812. The logical device numbers are set in a logical device number column 813. The storage capacities of the logical devices are set in a storage capacity column 814.

Figure 9:
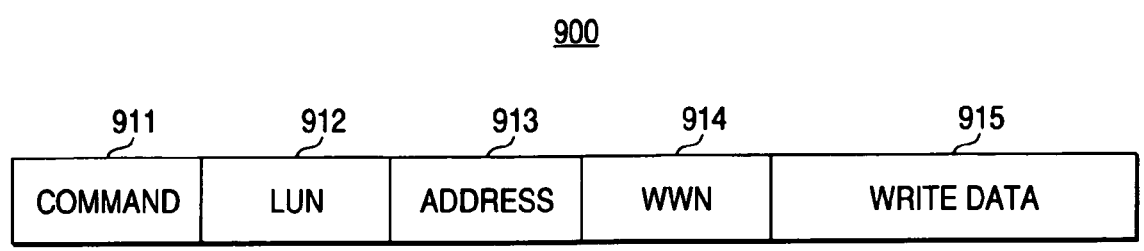
FIG. 9 is a diagram showing an example of a data format 900 of a data write request described as an embodiment of the invention.

FIG. 9 shows an example of the data format of a data write request that is a data input/output request transmitted when conducting data writing from the information processing device 10 with respect to the hard disk drives 28 of the first and second disk control devices 20-1 and 20-2. A data write command that is a command representing that the data input/output request is a data write request with respect to the first and second disk control devices 20-1 and 20-2 is set in a command column 911 of a data format 900. The logical unit number (LUN) of the logical unit that is the data writing destination is set in a LUN column 912. The address set in an address space of the logical unit (LU) that is the data writing destination is set in an address column 913. WWNj, which is given to the SAN adapter 13 that is the transmission source of the request, is set in a WWN column 914. The write data to be written to the hard disk drives 28 is set in a write data column 915.

Figure 10:
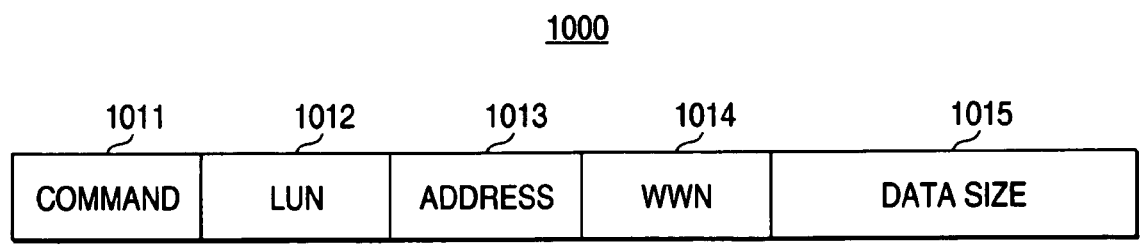
FIG. 10 is a diagram showing an example of a data format 1000 of a data read request described as an embodiment of the invention.

FIG. 10 shows an example of the data format of a data read request that is a data input/output request transmitted when conducting data reading from the information processing device 10 with respect to the hard disk drives 28 of the first and second disk control devices 20-1 and 20-2. A command representing that the data input/output request is a data read request with respect to the first and second disk control devices 20-1 and 20-2 is set in a command column 1011 of a data format 1000. The LUN of the logical unit that is the data reading destination is set in a LUN column 1012. The head address in an address space of the logical unit that is the data reading destination is set in an address column 1013. WWNj, which is given to the SAN adapter 13 that is the transmission source of the request, is set in a WWN column 1014. The data size of the data to be read by the data read request is set in a data size column 1015.

Relay Function

The first disk control device 20-1 includes the function (relay function) of enabling the information processing device to conduct data writing/reading using the logical units of the second disk control device as the logical units of the first disk control device. With this relay function, when the information processing device 10 conducts data writing/reading with respect to the logical units of the second disk control unit 20-2, it is not necessary for the information processing device 10 to be aware of whether those logical units are the logical units of the first disk control device 20-1 or the logical units of the second disk control device 20-2. Also, with this function, for example, when a new disk control device is introduced to a data center, it becomes possible to effectively utilize the old disk control devices. Namely, an old disk control device can be used as the second disk control device 20-2 without being discarded and the newly introduced disk control device can be used as the first disk control device 20-1, whereby services can be provided to the information processing device 10 by the new functions of the newly introduced disk control device and the storage resources of the old disk control device can be effectively utilized as storage resources for expanding the storage regions provided as the logical units of the first disk control device.

Also, when the first disk control device 20-1 receives a data input/output request where commands and parameters of the new functions to which the second disk control device 20-2 does not correspond are set, the first disk control device 20-1 converts the content of those commands and parameters to content that the second disk control device 20-2 can interpret and transmits, to the second disk control device 20-2, the data input/output request (second data writing/reading request) where the converted commands and parameters have been set. In other words, the first disk control device 20-1 includes a function as a relay device that relays, to the second disk control device 20-2, the data input/output request transmitted from the information processing device 10.

FIG. 11 shows a mapping management table 1100 that is managed in the first disk control device 20-1 and used in the above-described relay function. The mapping management table 1100 is stored in, for example, the channel control unit 21, the disk control unit 22 and the service processor (SVP) 26 of the first disk control device 20-1. The WWNc given to the communications ports of the channel control units 21 of the first disk control device 20-1 and the correspondences between the logical unit numbers (first LUN) that enable the information processing device 10 to identify the first disk control device 20-1 (i.e., the logical unit numbers set in the LUN column 812 of the logical unit management table 800 of the first disk control device 20-1) and the logical unit numbers (LUN) of the second disk control device 20-2 corresponded as the logical unit numbers (second LUN) (i.e., the logical unit numbers set in the LUN column 812 of the logical unit management table 800 of the second disk control device 20-2) of the first disk control device 20-1 are registered in the mapping management table 1100.

The actual logical units for which spaces are set in a second LUN column 1113 in the mapping management table 1100 are the logical units of the first disk control device 20-1 (called first logical units below). The actual logical units whose numbers are set in the second LUN column 1113 are the logical units of the second disk control device 20-2 (called second logical units below). For example, in FIG. 11, spaces are set for reference numerals 1121, 1122 and 1123, but the actual logical units identified by the first LUN and the communications ports (WWNc) corresponding to these are the logical units of the first disk control device 20-1 (first logical units). Also, "0" and "1" are respectively set as second LUN in reference numerals 1124 and 1125, but the logical units identified by the first LUN and the communications ports (WWNc) corresponding to these are the logical units of the second disk control device 20-2 (second logical units) whose logical unit numbers respectively correspond to "0" and "1".

The first disk control device 20-1 receiving a data input/output request transmitted from the information processing device 10 references the mapping management table 1100 and determines whether the LUN set in that data input/output request take as targets the logical units (LU) of the first disk control device 20-1 or take as targets the logical units (LU) of the second disk control device 20-2. In a case where the first disk control device 20-1 determines that the data input/output request takes as targets the logical units (LU) of the second disk control device 20-2, the first disk control device 20-1 transmits (function of relay transmitting device) the data input/output request (second data input/output request) to the second disk control device 20-2 via the SAN (first communications network 50).

Figure 12:
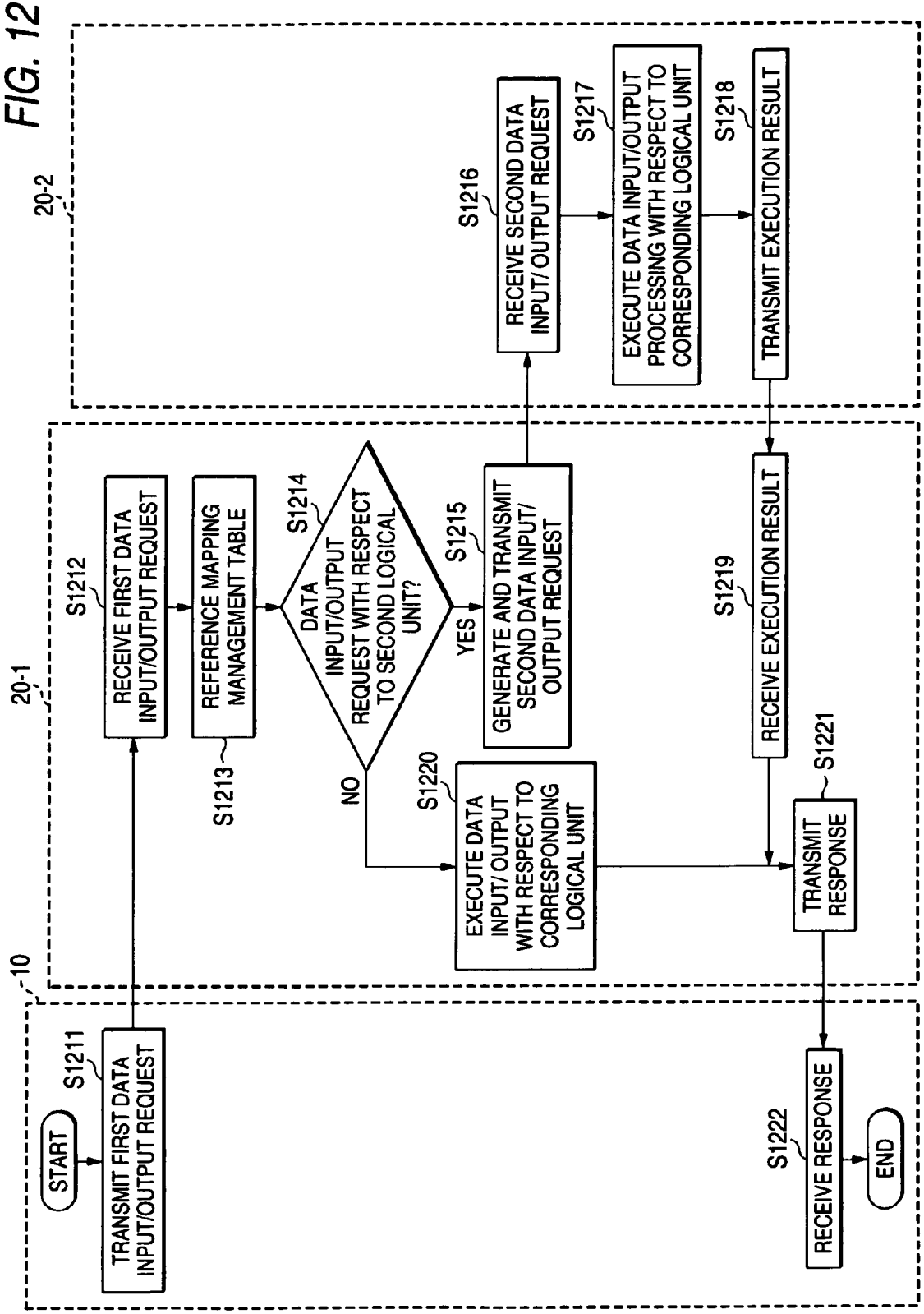
FIG. 12 is a diagram showing a flow chart describing processing conducted in a case where the information processing device 10 transmits a data input/output request with respect to the first disk control device 20-1 described as an embodiment of the invention.

FIG. 12 is a flow chart describing processing that is conducted in a case where the information processing device 10 has transmitted a data input/output request to the first disk control device 20-1. The processing will be described in order.

First, a data write/read request (first data input/output request) is transmitted from the information processing device 10 to the first disk control device 20-1 (S1211). The first disk control device 20-1 receives the transmitted first data input/output request (S1212). Next, the first disk control device 20-1 references the mapping management table 1100 (S1213) and determines whether the logical units (LU) set as data writing or reading destinations in the first data input/output request are the logical units of the first disk control device 20-1 (first logical units) or the logical units managed by the second disk control devices 20-2 (second logical units) (S1214). This determination is conducted by, for example, referencing the LUN columns 912 and 1012 set in the data input/output request.

In a case where, in the determination of S1214, the first disk control device 20-1 determines that the logical units (LU) set as data writing or reading destinations in the first input/output request are the logical units of the first disk control device 20-1 (first logical units) (S1214: NO), the first disk control device 20-1 executes data input/output with respect to the first logical units that are set in the data input/output request and which the first disk control device 20-1 itself manages (S1220). Thereafter, the processing proceeds to S1221.

In a case where, in the determination of S1214, the first disk control device 20-1 determines that the logical units (LU) set as data writing or reading destinations in the first input/output request are the logical units of the second disk control device 20-2 (second logical units) (S1214: YES), the first disk control device 20-1 searches the mapping management table 1100 for the logical unit numbers (LUN) of the second logical units corresponding to the logical unit numbers set in the data input/output request, generates a data input/output request (second data input/output request) corresponding to a command set in the first data input/output request and using as targets the second logical units corresponding to the searched-for logical unit numbers, and transmits the generated second data input/output request via the second communications network 51 to the second disk control device 20-2 (S1215).

When the second disk control device 20-2 receives the second data input/output request (S1216), the second disk control device 20-2 executes data input/output processing with respect to the second logical units set in the second data input/output request (S1217). After the execution of this data input/output processing, the second disk control device 20-2 transmits the execution result thereof to the first disk control device 20-1 (S1218). Here, information representing whether or not the data input/output processing with respect to the second data input/output request was conducted normally and data read by the processing in a case where the data input/output was processing relating to the reading of data are appropriately incidental to the execution result. The first disk control device 20-1 receives the execution result (S1219).

In the processing of S1221, the first disk control device 20-1 transmits, to the information processing device 10, the execution result in S1220 or a response making incidental the execution result received in S1219. The relay function of the first disk control device 20-1 is conducted as described above.

Logical Unit Management Function

On the management computer 30, application software for managing the logical units (LU), such as allocating, variously setting and monitoring the status of the logical units of the first and second disk control devices 20-1 and 20-2, operates. Included in the managing functions (logical unit managing functions) realized by this application software are a function for configuring the logical devices on the basis of the storage regions of the hard disk drives 28, a function for corresponding the second logical units of the second disk control device 20-2 to the first logical units of the first disk control device 20-1, a function for setting the logical units serving as replication sources and replication destinations in a case where a mirroring function and a data replication function between remote places are implemented, and a function for conducting setting relating to access restrictions such as zoning and LUN masking with respect to the first and second disk control devices 20-1 and 20-2 from the information processing device 10. The administrator of the first and second disk control devices 20-1 and 20-2 conducts setting of the logical units using the aforementioned managing functions provided by the management computer 30.

The management computer 30 accesses the information providing function (the mapping information transmitting unit 613) realized by the service processors (SVP) 26 of the first and second disk control devices 20-1 and 20-2 to separately collect information from the separate first and second disk control devices 20-1 and 20-2. Here, in a case where the relay function is realized in the storage system 1, sometimes problems arise during the information collection conducted using the information providing function. For example, when the management computer 30 conducts setting relating to the second disk control device 20-2, the management computer 30 acquires information relating to the logical units from the information providing function (function of the mapping information transmitting unit 613) of the second disk control device 20-2. In this case, the management computer 30 cannot acquire information (this information is managed only by the mapping management table 1100 of the first disk control device 20-1) representing whether or not the logical units of the second disk control device 20-2 are set as storage regions seen by the information processing device 10 as the logical units of the first disk control device 20-1, i.e., whether or not the logical units of the second disk control device 20-2 are corresponded (mapped) to the first logical units of the first disk control device 20-1. Thus, when the management computer 30 attempts to conduct setting relating to the logical units of the second disk control device 20-2, a situation can arise where the logical units are presented to the user as unused logical units that can be used for another purpose despite the fact that, for example, those logical units are corresponded (mapped) to the first logical units.

Figure 13:
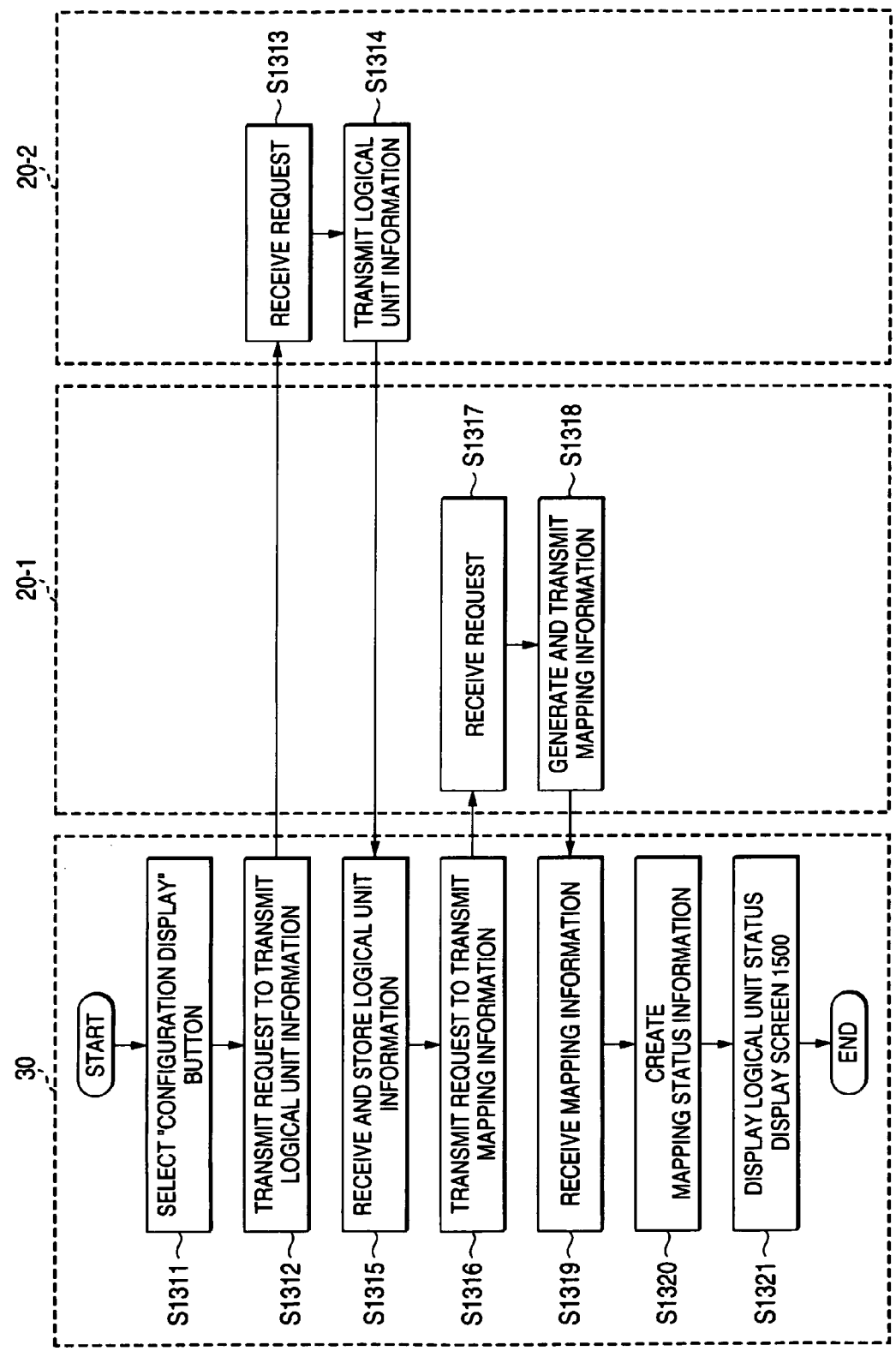
FIG. 13 is a diagram showing a flow chart describing a flow of a series of mechanisms where whether or not second logical units are corresponded to first logical units in the first disk control device 20-1 is displayed on a display device 37 described as an embodiment of the invention.

The storage system 1 of the present embodiment is disposed with a mechanism that displays, on the display device 37, whether or not those logical units (second logical units) are corresponded (whether or not they are mapped) to the first logical units in the first disk control device 20-1 in order to make the user of the management computer 30 conducting the setting aware of this when setting relating to the logical units (second logical units) that the second disk control device 20-2 manages is conducted in the management computer 30. The flow of processing conducted in the storage system 1 relating to this mechanism will be described below together with the flow chart shown in FIG. 13.

Figure 14:
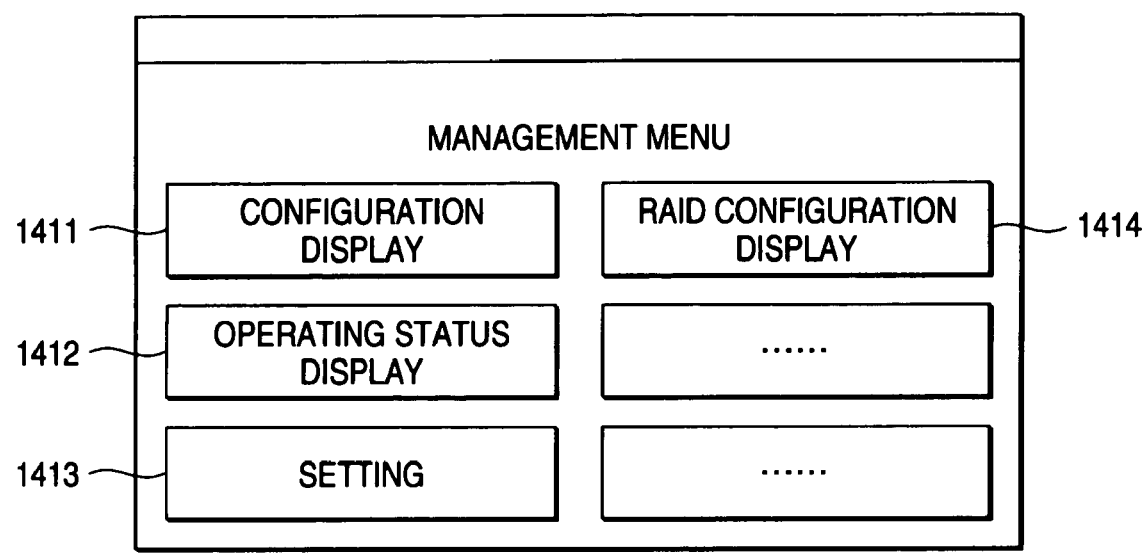
FIG. 14 is a diagram showing a management menu screen 1400 described as an embodiment of the invention.

Here, in order for a user such as the administrator of the storage system 1 to conduct setting relating to the logical units of the second disk control device 20-2, a "configuration display" button 1411 of a management menu screen 1400 shown in FIG. 14 is selected (S1311) and the management computer 30 displays, in response thereto, a logical unit status display screen 1500 shown in FIG. 15 in which the statuses of the logical units (second logical units) of the second disk control device 20-2 are described.

When the management computer 30 is aware of the fact that the "configuration display" button 1411 has been selected, the management computer 30 transmits a request to the second disk control device 20-2 instructing the second disk control device 20-2 to transmit all or some of the information (logical unit information) registered in the logical unit management table (second logical unit management table) 800 that the second disk control device 20-2 manages in order to acquire information necessary to display the logical unit status display screen 1500 of FIG. 15 (S1312). When the second disk control device 20-2 receives the transmission request transmitted from the management computer 30 (S1313), the second disk control device 20-2 generates logical unit information on the basis of the logical unit management table (second logical unit management table) 800 and transmits the generated logical unit information to the management computer 30 (S1314) (function of the logical unit information transmitting unit 622). When the management computer 30 receives the logical unit information (function of the logical unit information receiving unit 631), the management computer 30 stores this in the memory 32 (S1315).

Next, in order for the management computer 30 to collect information necessary to display the logical unit status display screen 1500 of FIG. 15, the management computer 30 transmits to the first disk control device 20-1 a transmission request instructing the first disk control device 20-1 to transmit all or some of the content (mapping information) registered in the mapping management table 1100 (S1316). When the first disk control device 20-1 receives this request transmitted from the management computer 30 (S1317), the first disk control device 20-1 generates mapping information on the basis of the mapping management table 1100 and transmits the generated mapping information to the management computer 30 (S1318) (mapping information transmitting unit 613).

Although the transmission of the mapping information from the first disk control device 20-1 to the management computer 30 is passively conducted in response to the transmission request transmitted in this manner from the management computer 30, sometimes the mapping information is voluntarily transmitted to the management computer 30 from the first disk control device 20-1. This voluntary transmission of the mapping information is conducted in response to, for example, the fact that the content of the mapping information table 1100 has been updated. In this manner, new mapping information can always be managed in the management computer 30 due to the transmission of the mapping information from the first disk control device 20-1 being voluntarily conducted.

When the management computer 30 receives the mapping information transmitted from the first disk control device 20-1 (S1319) (function of the mapping information receiving unit 632), the management computer 30 next references the received logical unit information and the mapping information, and generates mapping status information that is information representing whether or not the logical units (second logical units) of the second disk control device 20-2 are corresponded (whether or not they are mapped) to the logical units of the first disk control device 20-1 (function of the mapping status information generating unit 633) (S1320). Then, the management computer 30 describes the information corresponding to the generated mapping status information, generates the logical unit status display screen 1500 shown in FIG. 15 and displays the generated logical unit status display screen 1500 on the display device 37 (function of the mapping status information display unit 634).

The logical unit status display screen 1500 will be described. In FIG. 15, the WWNc given to the communications ports of the channel control units 21 of the second disk control device 20-2 are displayed in a communications port ID column 1511. The logical unit numbers (LUN) of the second disk control device 20-2 are displayed in a LUN column 1512. The logical device numbers of the second disk control device 20-2 are displayed in a logical device number column 1513. The storage capacities of the logical devices with respect to which the second disk control device 20-2 conducts data writing/reading (data input/output) are displayed in a storage capacity column 1514. Whether or not the logical units (second logical units) are corresponded as the logical units (first logical units) of the first disk control device 20-1 in the aforementioned relay function (whether or not they are mapped) is displayed in a mapping presence column 1515. That is, a "yes" displayed in the mapping presence column 1515 with respect to the logical units (second logical units) indicates that these logical units are corresponded to the logical units (first logical units) of the first disk control device 20-1, and a "no" displayed in the mapping presence column 1515 with respect to the logical units (second logical units) indicates that these logical units are not corresponded to the logical units (first logical units) of the first disk control device 20-1.

According to the above mechanism, when a user such as the administrator of the storage system 1 sets and manages the logical units (second logical units), the user references the logical unit status display screen 1500 so as to be able to verify whether or not the logical units (second logical units) of the second disk control device 20-2 are corresponded (whether or not they are mapped) to the logical units (first logical units) of the first disk control device 20-1. For this reason, in a case where, for example, the management computer 30 attempts to conduct setting relating to the logical units of the second disk control device 20-2, a situation no longer arises where the user ends up being made to verify that the logical units are logical units that can be used for other purposes despite the fact that those logical units are corresponded (mapped) to the first logical units.

Thus, in a case where the user configures the logical devices on the basis of the storage regions of the hard disk drives 28, a case where the user corresponds the second logical units of the second disk control device 20-2 with respect to the first logical units of the first disk control device 20-1, a case where the user sets the logical units serving as replication sources and replication destinations when implementing the mirroring function or the data replication function between remote places, or a case where the user conducts setting relating to access restrictions such as zoning and LUN masking with respect to the first and second disk control devices 20-1 and 20-2 from the information processing device 10, erroneous setting can be prevented where the logical units (second logical units) end up being set to be used for other purposes despite the fact that they have been corresponded (mapped) to the first logical units and can no longer be used for other purposes. Due to this function being provided, the storage resources of the first and second disk control devices 20-1 and 20-2 can be reliably managed and it becomes possible to reliably and smoothly manage the resources of the storage system 1.

An embodiment of the invention has been described above, but the description of the preceding embodiment is for facilitating understanding of the invention and is not intended to limit the invention. Of course, the invention can be altered and improved without deviating from the gist thereof, and equivalents are included in the invention.

What is claimed is:

1. In a storage system including
a first storage device control device that is communicably connected to a first information processing device, receives a first data write or read request transmitted from the first information processing device and conducts data writing or reading with respect to first storage devices in response to the request,
a second storage device control device that is communicably connected to the first storage device control device, receives a second data write or read request transmitted from the first disk control device and conducts data writing or reading with respect to second storage devices in response to the request, and
a second information processing device communicably connected to the first and second storage device control devices, wherein
the first storage device control device includes a first logical unit management table managing unit that stores a first logical unit management table in which is registered identification information of first logical units that are units identifying storage regions of the first storage devices,
the second storage device control device includes a second logical unit management table managing unit that stores a second logical unit management table in which is registered identification information of second logical units that are units identifying storage regions of the second storage devices,
the first storage device control device includes a mapping management table managing unit that stores a mapping management table in which is registered correspondences between the first logical units and the second logical units and which the first storage device control device references when the first storage device control device receives the first data write or read request and determines whether the storage regions identified by the first logical units set in the request are the storage regions of the first storage devices or the storage regions of the second storage devices,
the second storage device control device includes a logical unit information transmitting unit that transmits, to the second information processing device, logical unit information including all or some of the identification information of the second logical units registered in the second logical unit management table,
the first storage device control device includes a mapping information transmitting unit that transmits, to the second information processing device, mapping information that is all or some of the mapping management table,
the second information processing device includes a logical unit information receiving unit that receives the logical unit information,
the second information processing device includes a mapping information receiving unit that receives the mapping information, and
the second information processing device includes a mapping status information generating unit that references the received logical unit information and the mapping information to generate mapping status information that is information representing whether the second logical units are corresponded to the first logical units,
a storage device control device including the functions of the first storage device control device.

2. The storage device control device of claim 1, wherein the storage device control device includes a relay transmitting unit where
when the first data write or read request transmitted from the first information processing device is received, the relay transmitting unit determines, on the basis of the mapping management table, whether or not the first logical units set in the request are corresponded to the second logical units,
when the first logical units set in the first data write or read request are not corresponded to the second logical units, the relay transmitting unit conducts data writing or reading using the first logical units as targets, and
when the first logical units set in the first data write or read request are corresponded to the second logical units, the relay transmitting unit transmits, to the second storage device control device, the second data write or read request using the corresponding second logical units as targets.

3. The storage device control device of claim 1, wherein the mapping management table managing unit updates the second logical units and the correspondences between the second logical units and the first logical units registered in the mapping management table, and
the mapping information transmitting unit transmits the mapping information to the second information processing device in response to the fact that there has been an update.

4. The storage device control device of claim 1, wherein the first and second storage devices are hard disk drives,
the first and second storage device control devices include a RAID control unit that manage, by the RAW) format, the storage regions of the hard disk drives, and
the first and second logical units are corresponded to and configured by information identifying the range of storage regions provided by the hard disk drives being managed by the RAID format.

5. The storage device control device of claim 1, further including
a channel control unit that includes a CPU, a memory and a communications interface for communicating with the first information processing device and the second storage device control device,
a disk control unit that conducts control relating to a CPU, a memory and data input or output with respect to hard disk drives functioning as the first storage devices,
a cache memory with respect to which the channel control unit and the disk control unit conduct data writing or reading, and
a service processor configured to include a CPU and a memory.

6. The storage device control device of claim 1, further including
a channel control unit that includes a CPU, a memory and a communications interface for communicating with the first information processing device and the second storage device control device,
a disk control unit that conducts control relating to a CPU, a memory and data input or output with respect to hard disk drives functioning as the first storage devices,
a cache memory with respect to which the channel control unit and the disk control unit conduct data writing or reading, and
a service processor configured to include a CPU and a memory, with the mapping information transmitting unit being realized by the CPU of the service processor executing a program stored in the memory.

7. A storage system including:

a first storage device control device that is communicably connected to a first information processing device, receives a first data write or read request transmitted from the first information processing device and conducts data writing or reading with respect to first storage devices in response to the request;

a second storage device control device that is communicably connected to the first storage device control device, receives a second data write or read request transmitted from the first disk control device and conducts data writing or reading with respect to second storage devices in response to the request; and a second information processing device communicably connected to the first and second storage device control devices, wherein the first storage device control device includes a first logical unit management table managing unit that stores a first logical unit management table in which is registered identification information of first logical units that are units identifying storage regions of the first storage devices, the second storage device control device includes a second logical unit management table managing unit that stores a second logical unit management table in which is registered identification information of second logical units that are units identifying storage regions of the second storage devices, the first storage device control device includes a mapping management table managing unit that stores a mapping management table in which is registered correspondences between the first logical units and the second logical units and which the first storage device control device references when the first storage device control device receives the first data write or read request and determines whether the storage regions identified by the first logical units set in the request are the storage regions of the first storage devices or the storage regions of the second storage devices, the second storage device control device includes a logical unit information transmitting unit that transmits, to the second information processing device, logical unit information including all or some of the identification information of the second logical units registered in the second logical unit management table, the first storage device control device includes a mapping information transmitting unit that transmits, to the second information processing device, mapping information that is all or some of the mapping management table, the second information processing device includes a logical unit information receiving unit that receives the logical unit information, the second information processing device includes a mapping information receiving unit that receives the mapping information, and the second information processing device includes a mapping status information generating unit that references the received logical unit information and the mapping information to generate mapping status information that is information representing whether the second logical units are corresponded to the first logical units.

8. The storage system of claim 7, wherein the second storage device control device includes a channel control unit that includes a CPU, a memory and a communications interface for communicating with the second storage device control device, a disk control unit that conducts control relating to a CPU, a memory and data input or output with respect to hard disk drives functioning as the second storage devices, and a cache memory with respect to which the channel control unit and the disk control unit conduct data writing or reading.

9. In a storage system including a first storage device control device that is communicably connected to a first information processing device, receives a first data write or read request transmitted from the first information processing device and conducts data writing or reading with respect to first storage devices in response to the request, a second storage device control device that is communicably connected to the first storage device control device, receives a second data write or read request transmitted from the first disk control device and conducts data writing or reading with respect to second storage devices in response to the request, and a second information processing device communicably connected to the first and second storage device control devices, wherein the first storage device control device includes a first logical unit management table managing unit that stores a first logical unit management table in which is registered identification information of first logical units that are units identifying storage regions of the first storage devices, the second storage device control device includes a second logical unit management table managing unit that stores a second logical unit management table in which is registered identification information of second logical units that are units identifying storage regions of the second storage devices, the first storage device control device includes a mapping management table managing unit that stores a mapping management table in which is registered correspondences between the first logical units and the second logical units and which the first storage device control device references when the first storage device control device receives the first data write or read request and determines whether the storage regions identified by the first logical units set in the request are the storage regions of the first storage devices or the storage regions of the second storage devices, the second storage device control device includes a logical unit information transmitting unit that transmits, to the second information processing device, logical unit information including all or some of the identification information of the second logical units registered in the second logical unit management table, the first storage device control device includes a mapping information transmitting unit that transmits, to the second information processing device, mapping information that is all or some of the mapping management table, the second information processing device includes a logical unit information receiving unit that receives the logical unit information, the second information processing device includes a mapping information receiving unit that receives the mapping information, and the second information processing device includes a mapping status information generating unit that references the received logical unit information and the mapping information to generate mapping status information that is information representing whether the second logical units are corresponded to the first logical units, a recording medium in which is recorded a program for causing a storage device control device including the functions of the first storage device control device to realize the functions of the mapping information transmitting unit.

10. In a storage system including a first storage device control device that is communicably connected to a first information processing device, receives a first data write or read request transmitted from the first information processing device and conducts data writing or reading with respect to first storage devices in response to the request, a second storage device control device that is communicably connected to the first storage device control device, receives a second data write or read request transmitted from the first information processing device and conducts data writing or reading with respect to second storage devices in response to the request, and a second information processing device communicably connected to the first and second storage device control devices, wherein the first storage device control device includes a first logical unit management table managing unit that stores a first logical unit management table in which is registered identification information of first logical units that are units identifying storage regions of the first storage devices, the second storage device control device includes a second logical unit management table managing unit that stores a second logical unit management table in which is registered identification information of second logical units that are units identifying storage regions of the second storage devices, the first storage device control device includes a mapping management table managing unit that stores a mapping management table in which is registered correspondences between the first logical units and the second logical units and which the first storage device control device references when the first storage device control device receives the first data write or read request and determines whether the storage regions identified by the first logical units set in the request are the storage regions of the first storage devices or the storage regions of the second storage devices, the second storage device control device includes a logical unit information transmitting unit that transmits, to the second information processing device, logical unit information including all or some of the identification information of the second logical units registered in the second logical unit management table, the first storage device control device includes a mapping information transmitting unit that transmits, to the second information processing device, mapping information that is all or some of the mapping management table, the second information processing device includes a logical unit information receiving unit that receives the logical unit information, the second information processing device includes a mapping information receiving unit that receives the mapping information, and the second information processing device includes a mapping status information generating unit that references the received logical unit information and the mapping information to generate mapping status information that is information representing whether the second logical units are corresponded to the first logical units, an information processing device including the functions of the second information processing device.

11. The information processing device of claim 10, further including a display device and a mapping status information display unit that displays the mapping status information on the display device.

12. A method of controlling a storage system including a first storage device control device that is communicably connected to a first information processing device, receives a first data write or read request transmitted from the first information processing device and conducts data writing or reading with respect to first storage devices in response to the request, a second storage device control device that is communicably connected to the first storage device, receives a second data write or read request transmitted from the first disk control device and conducts data writing or reading with respect to second storage devices in response to the request, and a second information processing device communicably connected to the first and second storage device control devices, wherein the first storage device control device stores a first logical unit management table in which is registered identification information of first logical units that are units identifying storage regions of the first storage devices, the second storage device control device stores a second logical unit management table in which is registered identification information of second logical units that are units identifying storage regions of the second storage devices, the first storage device control device stores a mapping management table in which is registered correspondences between the first logical units and the second logical units and which the first storage device control device references when the first storage device control device receives the first data write or read request and determines whether the storage regions identified by the first logical units set in the request are the storage regions of the first storage devices or the storage regions of the second storage devices, the second storage device control device transmits, to the second information processing device, logical unit information including all or some of the identification information of the second logical units registered in the second logical unit management table, the first storage device control device transmits, to the second information processing device, mapping information that is all or some of the mapping management table, the second information processing device receives the logical unit information, the second information processing device receives the mapping information, and the second information processing device references the received logical unit information and the mapping information to generate mapping status information that is information representing whether the second logical units are corresponded to the first logical units.

* * * * *